(12) United States Patent
Risdal et al.

(10) Patent No.: US 6,786,952 B1
(45) Date of Patent: Sep. 7, 2004

(54) MEMBRANE AND USE THEREOF (75) Inventors: Turid Risdal, Porsgrunn (NO); Stein Julsrud, Skien (NO); Tyke Naas, Porsgrunn (NO); Bent Erlend Vigeland, Skien (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 10/089,236

(22) PCT Filed: Sep. 22, 2000

(86) PCT No.: PCT/NO00/00312
§ 371 (c)(1),
(2), (4) Date: Jun. 27, 2002

(87) PCT Pub. No.: WO01/23078
PCT Pub. Date: Apr. 5, 2001

(30) Foreign Application Priority Data

Sep. 28, 1999 (NO) ................................. 994715

(51) Int. Cl.$^7$ ........................ B01D 53/22; B01D 71/02
(52) U.S. Cl. ...................................... 95/54; 96/4; 96/11
(58) Field of Search .............................. 95/54; 96/4, 11

(56) References Cited

U.S. PATENT DOCUMENTS

| | | | | |
|---|---|---|---|---|
| 5,160,713 A | * | 11/1992 | Mazanec et al. ............ 423/210 |
| 5,162,301 A | * | 11/1992 | Reich et al. ................ 505/150 |
| 5,240,473 A | * | 8/1993 | Carolan et al. ................. 95/54 |
| 5,240,480 A | | 8/1993 | Thorogood et al. |
| 5,306,411 A | | 4/1994 | Mazanec et al. |
| 5,547,494 A | * | 8/1996 | Prasad et al. ................... 95/54 |
| 5,599,383 A | * | 2/1997 | Dyer et al. ...................... 96/8 |
| 5,648,304 A | * | 7/1997 | Mazanec et al. ............ 501/134 |
| 5,712,220 A | * | 1/1998 | Carolan et al. ............. 502/400 |
| 5,714,091 A | | 2/1998 | Mazanec et al. |
| 5,733,435 A | * | 3/1998 | Prasad et al. ............... 205/765 |
| 5,817,597 A | * | 10/1998 | Carolan et al. ............. 502/400 |
| 5,820,654 A | * | 10/1998 | Gottzman et al. .............. 95/54 |
| 5,910,238 A | * | 6/1999 | Cable et al. ................. 205/634 |
| 5,935,298 A | * | 8/1999 | Prasad et al. ................... 95/39 |
| 5,938,822 A | * | 8/1999 | Chen et al. ..................... 96/11 |
| 5,954,859 A | * | 9/1999 | Keskar et al. .................. 95/54 |
| 5,964,922 A | * | 10/1999 | Keskar et al. .................. 95/39 |
| 5,976,223 A | * | 11/1999 | Prasad et al. ................... 95/54 |
| 6,010,614 A | * | 1/2000 | Keskar et al. .............. 205/765 |
| 6,056,807 A | * | 5/2000 | Carolan et al. ................... 96/4 |
| 6,090,500 A | * | 7/2000 | Ishihara et al. ............... 429/33 |
| 6,149,714 A | * | 11/2000 | Kobayashi ...................... 95/54 |
| 6,165,431 A | * | 12/2000 | Mackay et al. ............. 423/219 |
| 6,403,041 B1 | * | 6/2002 | Takahashi et al. .......... 422/240 |
| 6,488,739 B1 | * | 12/2002 | Mazanec et al. ................ 95/54 |
| 6,492,290 B1 | * | 12/2002 | Dyer et al. ..................... 502/4 |
| 2002/0078906 A1 | * | 6/2002 | Prasad et al. ................ 122/40 |

FOREIGN PATENT DOCUMENTS

| | | |
|---|---|---|
| EP | 0 438 902 | 7/1991 |
| EP | 0 732 138 | 9/1996 |
| NO | 306014 | 9/1999 |
| WO | 98/55394 | 12/1998 |

* cited by examiner

*Primary Examiner*—Robert H. Spitzer
(74) *Attorney, Agent, or Firm*—Wenderoth, Lind & Ponack, LLP (57) ABSTRACT

The present invention relates to a solid multicomponent membrane for use in a reactor where the membrane comprises a mixed metal oxide having a structure represented by the formula: $La_{1-x}Ca_x(Fe_{1-y-y'}Ti_yAl_{y'})_wO_{3-d}$ wherein x, y, y', w, and d each represent a number such that $0.1 \leq (y+y') \leq 0.8$, $0.15 \leq (x+y') \leq 0.95$, $0.05 \leq (x-y) \leq 0.3$, $0.95 < w < 1$, and d equals a number that renders the compound charge neutral and is not less than zero and not greater than about 0.8. Furthermore, the present invention relates to a use of the membrane in a reactor for generating heat or for generating synthesis gas.

5 Claims, 10 Drawing Sheets

MEMBRANE AND USE THEREOF

The present invention relates to a solid multicomponent membrane which is particularly suited as dense oxygen separation membrane in applications with high driving forces for oxygen transport.

Inorganic membranes show promise for use in commercial processes for separating oxygen from an oxygen containing gaseous mixture. Envisioned applications range from small scale oxygen pumps for medical use to large scale integrated gasification combined cycle plants. This technology encompasses two different kinds of membrane materials; oxygen ion conductors and mixed oxygen ion and electronic conductors. In both cases the oxygen ion transport is by oxygen ion vacancies or interstitial oxygen in the membrane material. In the case of mixed conductors electrons are also transported in the membrane material.

Membranes formed from mixed conducting oxides can be used to selectively separate oxygen from an oxygen containing gaseous mixture at elevated temperatures. Oxygen transport occurs when a difference in the chemical potential of oxygen ($\Delta \log p_{O2}$) exists across the membrane. On the high oxygen partial pressure side of the membrane, molecular oxygen dissociates into oxygen ions which migrate to the low oxygen partial pressure side of the membrane and recombine there to form oxygen molecules. Electrons migrate through the membrane in the opposite direction to conserve charge. The rate at which oxygen permeates through the membrane is mainly controlled by three processes; (I) the rate of oxygen exchange at the high oxygen partial pressure surface of the membrane, (II) the oxygen diffusion rate within the membrane and (III) the rate of oxygen exchange on the low oxygen partial pressure surface of the membrane. If the rate of oxygen permeation is controlled by the oxygen diffusion rate, the oxygen permeability is known to be inversely proportional to the membrane thickness (Fick's law). If the membrane thickness is decreased below a certain critical membrane thickness which depends on temperature and other process parameters, surface oxygen exchange on one or both membrane surfaces will become oxygen permeation rate limiting. The rate of oxygen permeation is then independent of the membrane thickness.

During recent years the use of dense mixed conducting membranes in various processes has been described. Examples are oxygen production described in European Patent Application No. 95100243.5 (EP-A-663230), U.S. Pat. No. 5,240,480, U.S. Pat. No. 5,447,555, U.S. Pat. No. 5,516,359 and U.S. Pat. No. 5,108,465, partial oxidation of hydrocarbons described in U.S. Pat. No. 5,714,091 and European Patent Application No. 90134083.8 (EP-A438902), production of synthesis gas described in U.S. Pat. No. 5,356,728 and enrichment of a sweep gas for fossil energy conversion with economical $CO_2$ abatement as described in PCT/NO97/00170, PCT/NO97/00171 and PCT/NO97/00172.

For the application of MCM (Mixed Conducting Membrane) technology, the membrane material must fulfil certain requirements in addition to being a good mixed conductor. These fall into three categories; thermodynamic stability under static conditions, thermodynamic stability under dynamic conditions, and mechanical stability. The membrane material must be thermodynamically stable under any static condition within the appropriate temperature and oxygen partial pressure range. Furthermore, the membrane material must be stable against reaction with the additional components in the gaseous phase (e.g. $CO_2$, $H_2O$, $NO_x$, $SO_x$), and any solid phase in contact with it (e.g., seals and support material). This calls for different materials for different applications.

A membrane material that fulfils all the stability requirements under static conditions, may still be unstable when it is placed in a potential gradient. Any multi-component material kept in a potential gradient, e.g. oxygen partial pressure gradient or electrical potential gradient, will be subjected to driving forces acting to demix or decompose the material. These phenomena are called kinetic demixing and kinetic decomposition and are well described in the literature (e.g., Schmalzried, H. and Laqua, W., Oxidation of Metals 15 (1981) 339).

Kinetic demixing acts to gradually change the cationic composition of the membrane along the axis parallel to the applied potential. This phenomenon will always occur in materials where a mixture of cations are present on the same sublattice. Kinetic demixing may or may not reduce the performance and lifetime of the membrane.

Kinetic decomposition implies a total breakdown of the compound or compounds comprising the membrane, and results in the appearance of decomposition compounds on the membrane surface. This phenomenon occurs in all multicomponent materials when placed in a potential gradient exceeding a certain critical magnitude. A membrane kept in an oxygen partial pressure gradient large enough for kinetic decomposition to take place, will have its performance and lifetime reduced. Those skilled in the art recognize the phenomenon of kinetic decomposition as one of the major critical parameters in developing durable membranes, particularly for processes involving large potential gradients across the membrane.

Furthermore, when the membrane is placed in an oxygen chemical potential gradient and it responds by establishing a gradient in the concentration of oxygen vacancies or interstitials parallel to the direction of the applied potential, the membrane experiences mechanical stress with the strain plane perpendicular to the direction of the applied potential gradient. This mechanical stress is caused by a phenomenon referred to as chemical expansion, which can be defined as the dependency of the unit cell volume of the nonstoichiometric oxide on the oxygen stoichiometry. When the chemical expansion exceeds a critical limit, and gives rise to mechanical stress exceeding a critical limit governed by the membrane package design, a mechanical failure of the membrane package may result Those skilled in the art recognize the phenomenon of chemical expansion as one of the major critical parameters in developing durable membrane packages.

Two prior art processes can be put forward as particularly relevant to the present invention: the production of synthesis gas in which an oxygen containing gas is fed to the first side of a membrane, whereby pure oxygen is transported through the membrane, and the so produced oxygen partially oxidizes a hydrocarbon containing gas supplied to the second side of the membrane; and fossil energy conversion with economical $CO_2$ abatement (e.g. PCT/NO97/00172) where an oxygen containing gas is fed to the first side of a membrane, whereby pure oxygen is transported through the membrane, and the produced oxygen oxidizes a hydrocarbon containing gas supplied to the second side of the membrane.

The process conditions of the relevant process define the environs of the membrane and play a determining role in the selection of membrane material. Examples of typical process parameters for the two said processes are given in Tables 1 and 2, respectively. Both processes are characterized by a log$p_{O2}$ gradient across the membrane of well above 10 decades. Furthermore, both processes call for membrane materials that have a high stability against reaction with $CO_2$ under reducing conditions, as the $CO_2$ pressure is well above 1 bar.

TABLE 1

Example of process parameters for an MCM syngas production process

|  | Fuel side | Air side |
| --- | --- | --- |
| Temperature | 750–950° C. | 750–950° C. |
| Total pressure | 30 bar | 1.5 bar |
| $p_{O2}$ | $10^{-17}$ bar | 0.03–0.23 bar |
| $p_{CO2}$ | 3–5 bar | 0.04–0.05 bar |
| Other major components | $H_2$, CO, $H_2O$, $CH_4$ | $N_2$ |

TABLE 2

Example of process parameters for an MCM power production process

|  | Fuel side | Air side |
| --- | --- | --- |
| Temperature | 1100–1200° C. | 1100–1200° C. |
| Total pressure | 12–32 bar | 10–30 bar |
| $p_{O2}$ | appr. $10^{-12}$ bar  | 0.5–5 bar |
| $p_{CO2}$ | 0–12 bar | <2 bar |
| Other major components | $H_2O$, $CH_4$ | $N_2$ |

During recent years dense mixed conducting membranes have been described.

U.S. Pat. No. 5,306,411 discloses a solid, gas-impervious, electron-conductive, oxygen ion-conductive, single-phase membrane for use in an electrochemical reactor, said membrane being formed from a perovskite represented by the formula:

$$A_s A'_t B_u B'_v B''_w O_x$$

wherein A represents a lanthanide, Y, or mixture thereof; A' represents an alkaline earth metal or mixture thereof; B represents Fe; B' represents Cr, Ti, or mixture thereof; and B'' represents Mn, Co, V, Ni, Cu, or mixture thereof and s, t, u, v, w, and x each represent a number such that:

s/t equals from about 0.01 to about 100;

u equals from about 0.01 to about 1;

v equals from about 0.01 to 1;

w equals from zero to about 1;

x equals a number that satisfies the valences of the A, A', B, B' and B'' in the formula; and 0.9<(s+t)/(u+v+w)<1.1.

The examples focusing on A' representing Sr and B' representing Cr.

U.S. Pat. No. 5,712,220 describes compositions capable of operating under high carbon dioxide partial pressures for use in solid-state oxygen producing devices represented by the formula $Ln_x A'_x A''_x B_y B'_y B''_y O_{3-x}$, wherein Ln is an element selected from the f block lanthanides, A' is selected from Group 2, A'' is selected from Groups 1, 2 and 3 and the f block lanthanides, and B, B', B'' are independently selected from the d block transition metals, excluding titanium and chromium, wherein 0<=x<1, 0<x'<1, 0<=x''<1, 0<y<1.1, 0<y'<1.1, 0<=y''<1.1, x+x'+x''=1.0, 1.1>y+y'+y''>1.0 and z is a number which renders the compound charge neutral wherein such elements are represented according to the Periodic Table of the Elements adopted by IUPAC. The examples focusing on A' representing Sr or Ba, B representing Co, B' representing Fe, and B'' representing Cu.

WO97/41060 describes a solid state membrane for use in a catalytic membrane reactor wherein said membrane is fabricated from a mixed metal oxide material having a brownmillerite structure and having the general stoichiometry $A_{2-x} A'_x B_{2-y} B'_y O_{5+z}$, where A is an alkaline earth metal ion or mixture of alkaline earth metal ions; A' is a metal ion or mixture of metal ions where the metal is selected from the group consisting of the lanthanide series or is yttrium; B is a metal ion or mixture of metal ions wherein the metal is selected from the group consisting of 3d transition metals, and the group 13 metals; B' is a metal ion or mixture of metal ions where the metal is selected from the group consisting of the 3d transition metals, the group 13 metals, the lanthanides and yttrium; x is a number greater than 0 and less than 2, y is a number greater than 0 and less than or equal to 2, and z is a number greater than zero and less than one that renders the compound charge neutral. The examples focus on the most preferred combination of elements given by A representing Sr, A' representing La, B representing Ga, and B' representing Fe.

U.S. Pat. No. 5,306,411, U.S. Pat. No. 5,712,220, and WO97/41060 each encompass wide ranges of membrane compositions. It is known to those skilled in the art that a great number of compositions encompassed by the claims of U.S. Pat. No. 5,306,411 and U.S. Pat. No. 5,712,220 are inherently unstable as perovskites and that a great number of compositions encompassed by WO97/41060 are inherently unstable as brownmillerites under all conditions relevant to membrane processes. Furthermore, a large number of the compositions encompassed by U.S. Pat. No. 5,306,411, U.S. Pat. No. 5,712,220, and WO97/41060 are characterised by low or zero oxygen flux under all conditions relevant to membrane processes.

The main object of the present invention was to arrive at an improved membrane showing good stability against reaction with carbon dioxide and against reduction of oxide components to metal.

Another object of the present invention was to arrive at an improved membrane showing stability against kinetic decomposition and resistance to mechanical failure due to chemical expansion stresses.

The inventors found that a certain class of multicomponent metallic oxides are particularly suited as membrane materials in processes in which the membrane is subjected to a large potential gradient, e.g. oxygen partial pressure difference of 6–7 orders of magnitude or more across the membrane. These compositions overcome problems associated with kinetic decomposition. Additionally, due to their low chemical expansion and high stability against carbon dioxide and water, these materials are particularly suited as membranes for the production of syngas and for fossil energy conversion with economical $CO_2$ abatement.

The compositions according to the present invention are based on the so called perovskite structure, named after the mineral perovskite, $CaTiO_3$, but the cation stoichiometry is different from the ideal perovskite, and it is this difference that gives the compositions according to the present invention superior stability in a potential gradient. Furthermore, the process conditions associated with the production of syngas or fossil energy conversion with economical $CO_2$ abatement limit the selection of elements of which the perovskite membrane can consist.

A material possessing the perovskite structure can in its most general form be written $A_v B_w O_{3-d}$, where A and B each represent any combination and number of elements provided that the ionic radii of the elements, as defined and tabulated by Shannon (Acta Cryst. (1976) A32, 751), satisfy the requirement that the number t defined by $$t = \frac{r_A + r_O}{\sqrt{2}\,(r_B + r_O)}$$

is not less than about 0.85 and not greater than about 1.10, and preferably t is not less than about 0.95 and not greater than about 1.05, where $r_A$ and $r_B$ represent the weighted average ionic radius of the A-elements and the B-elements, respectively, $r_O$ represents the ionic radius of the oxygen ion; and v, w, and d each represent numbers such that $0.9<v<1.05$, $0.9<w<1.05$, and d is not less than zero and not greater than about 0.8, and preferably $0.95<v<1.03$ and $0.95<w<1.03$.

The perovskite membrane for use in said processes must contain at least one element (I) whose valence is substantially mixed under said process conditions, and (II) with the additional requirement that the oxide of said element, or of any additional element of which the membrane is composed, does not reduce to a metal under any condition encompassed by said process conditions. This requirement points to the group of 3d transition metals, but with the limitation expressed by part (I) of the requirement excluding Sc, Ti, V, Cr, and Zn as the mixed valence element, and part (II) excluding Co, Ni, and Cu. Therefore, only Fe and Mn satisfy part (I) and part (II) of said requirement, and, hence, the membrane must contain Fe or Mn or mixture thereof. The membrane can not contain Co, Ni, or Cu. Therefore, the preferred compositions of U.S. Pat. No. 5,712,220, referenced in the "Background of the invention", can not be used as membranes in said processes. Said preferred compositions of U.S. Pat. No. 5,712,220 are expected to decompose under the conditions fo the said two processes, resulting in decreasingly poor oxygen permeation and eventually to cracking and complete breakdown of the membrane.

Said perovskite membrane containing Fe or Mn or a mixture thereof as the B cation(s) or as constituents of the mixture of B cations, must contain A cations stable as di- or tri-valent oxides of suitable ionic radii relative to the ionic radii of Fe and Mn according to said requirement for the value of t. This limitation in combination with the exclusion of radioactive elements effectively excludes all elements according to the Periodic Table of the Elements adopted by IUPAC, except Ca, Sr, Ba, and La.

Figure 1:
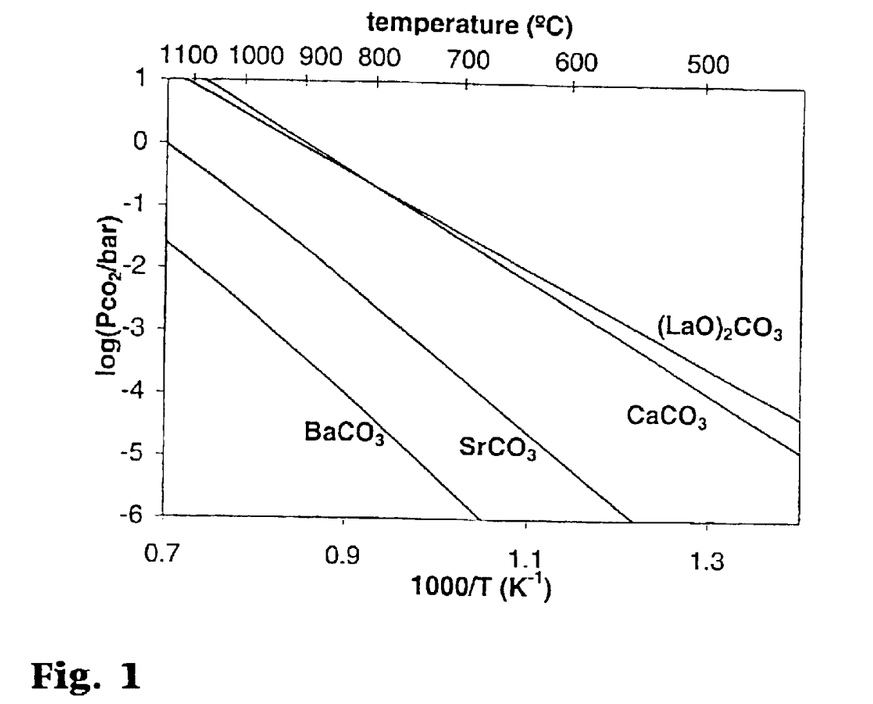
FIG. 1 shows the upper stability limit of selected oxides against reaction with carbon dioxide as a function of temperature.

Among the oxides of Ca, Sr, Ba, and La, the oxides of Sr and Ba are not sufficiently stable with respect to formation of carbonates, $SrCO_3$ and $BaCO_3$, to be used in said processes for which typical process parameters were given in Tables 1 and 2. The stability of the oxides of Ca, Sr, Ba, and La relative to the corresponding carbonates are shown in FIG. 1. Hence, for said processes, only La and Ca can be used as A-cations in the perovskite of which the membrane consists. The exclusion of Sr and Ba as constituents of the membrane, excludes the use of the preferred compositions of U.S. Pat. No. 5,712,220, U.S. Pat. No. 5,306,411, and WO97/41060, referenced in the "Background of the invention", as membranes in said processes. Said preferred compositions of U.S. Pat. No. 5,712,220, U.S. Pat. No. 5,306,411, and WO97/41060, all containing Sr or Ba, are expected to react with $CO_2$ and decompose under the formation of $SrCO_3$ and $BaCO_3$ under the conditions of said two processes, resulting in decreasingly poor oxygen permeation and eventually cracking and complete breakdown of the membrane.

In addition to containing the mixed valence elements Fe or Mn, or a mixture of Mn and Fe, the perovskite for use as a membrane in said processes can also contain one or more fixed valence elements as B cations; fixed valence meaning here that the particular ion has substantially the same valency at any spatial point in the membrane and at any time for the relevant process. The presence of such fixed valence elements may be needed in order to Increase the stability of the perovskite, to decrease the chemical expansion, to prevent ordering, or to enhance the performance of the perovskite as a membrane material in any other manner. The ions of the fixed valence elements must be of suitable ionic radii relative to the other B cations and A cations, according to said requirement for the value of t defined above. This limitation excludes all other elements than Ti, Cr, Al, Ga, Ge and Be. Furthermore, due to high vapor pressures of Ge containing species and low melting temperatures, Ge has to be excluded. Be is excluded on grounds of toxicity and high vapor pressure of the hydrate of beryllium. Of the remaining elements Al and Ga are expected to have similar effect as constituents in the perovskite, but the ionic radius of the Al ion is more favorable than of the Ga ion. Furthermore, the cost of Al is considerably lower than the cost of Ga. Hence, Ga can be excluded on the grounds of Al being a better choice. Under oxidizing conditions, the vapor pressure of $CrO_3(g)$ above chromium containing perovskites is high, and Cr is preferably avoided. Therefore, as a fixed valence B cation, only Ti and Al will be considered further.

The exclusion of Ga and Cr excludes the use of the preferred compositions of U.S. Pat. No. 5,306,411 and WO97/41060, referenced in the "Background of the invention", as membranes in said processes. Said preferred compositions of U.S. Pat. No. 5,306,411 containing Cr, are expected to become depleted in Cr as $CrO_3(g)$ evaporates from the surface of the membrane under the conditions of said two processes, resulting in decomposition of the membrane material and the formation of new compounds, which yields decreasingly poor oxygen permeation and eventually cracking and complete breakdown of the membrane.

According to said requirements, limitations, and exclusions treated above, the membrane material possessing the perovskite structure for use in said processes, must have a composition represented by the formula:

$$(La_{1-x}Ca_x)_v(B_{1-y}B'_y)_wO_{3-d}$$

wherein B represents Fe or Mn or mixture thereof; B' represents Ti or Al or mixture thereof; and x, y, v, w, and d each represent a number such that $0 \leq x \leq 1$, $0 \leq y \leq 1$, $0.9 \leq v \leq 1$, $0.9 \leq w \leq 1$, and d equals a number that renders the compound charge neutral and is not less than zero and not greater than about 0.8, and preferably $0.95 \leq v \leq 1$ and $0.95 \leq w \leq 1$.

Compositions containing no Ti or Al, i.e. y=0, are characterized by too high chemical expansion, as exemplified by the present Example 18, and can not be used as membranes in said processes. The chemical expansion is higher for compositions containing Mn than for compositions containing Fe.

Compositions containing Ti, Al, or Ti and Al, i.e. B' represents Ti, Al, or a mixture of Ti and Al, and y>0, are characterized by an improved (lower) chemical expansion as compared with compositions containing no Ti and no Al, i.e. y=0, as exemplified by a comparison of the present examples 17 and 18. The compositions of Example 17 with B representing Fe display chemical expansion characteristics that are acceptable for a membrane material in said processes.

Compositions containing Ti and Al, i.e. B' represents a mixture of Ti and Al, and y>0, are characterized by a further improvement (reducton) in the chemical expansion compared with compositions where B' represents Ti and y>0, as exemplified by a comparison of the present Examples 17 and 21. The composition of the present Example 21 with B representing Fe displays excellent chemical expansion characteristics for a membrane material in said processes.

Although compositions containing Mn and Ti, Al, or Ti and Al, i.e. B' represents Ti, Al, or mixture of Ti and Al, and y>0 and B represents Mn, are characterized by an improved (lower) chemical expansion as compared with compositions containing no Ti or Al, i.e. y=0, the improvement is not large enough to render these compositions acceptable as membrane materials in said processes. The membrane can, therefore, not contain substantial amounts of Mn. The present Example 20 exemplifies the high chemical expansion of Mn containing materials.

Following the discussion and further limitations hitherto, the membrane material possessing the perovskite structure for use in said processes, must have a composition represented by the formula:

$$(La_{1-x}Ca_x)_v(Fe_{1-y-y'}Ti_yA_{y'})_wO_{3-d}$$

wherein x, y, y', v, w, and d each represent a number such that $0 \leq x \leq 1$, $0 \leq y \leq 1$, $0 \leq y' < 1$, $0 < (y+y') < 1$, $0.9 \leq v \leq 1$, $0.9 \leq w \leq 1$, and d equals a number that renders the compound charge neutral and is not less than zero and not greater than about 0.8, and preferably $0.95 \leq v \leq 1$ and $0.95 \leq w \leq 1$.

Stoichiometric perovskite compositions represented by said formula, i.e. v=w=1, are kinetically unstable when subjected to large gradients (6–7 orders of magnitude or more) in the oxygen partial pressure. The kinetic decomposition that occurs in these materials gives rise to the formation of decomposition products on at least one of the membrane surfaces and a decrease in the oxygen flux with time. Such kinetic decomposition in the stoichiometric perovskite materials is exemplified by the present examples 12 and 15 and FIGS. 4, 8, 9, and 10. Kinetic decomposition becomes more pronounced when w>v. Therefore, stoichiometric perovskites (v=w), or perovskites with A-site deficiency (w>y) represented by said formula can not be used as membranes in said processes.

The exclusion of stoichiometric and A-site deficient perovskites, excludes the use of the compositions of U.S. Pat. No. 5,712,220 and WO97/41060, and excludes the use of the preferred compositions of U.S. Pat. No. 5,306,411 referenced in the "Background of the invention", as membranes in said processes. Said compositions of U.S. Pat. No. 5,712,220, U.S. Pat. No. 5,306,411, and WO97/41060, are expected to decompose in the large oxygen partial pressure gradient of said two processes, resulting in decreasingly poor oxygen permeation and eventually to cracking and complete breakdown of the membrane.

Compositions represented by said formula, and where the numbers v and w are selected such that v=1 and $0.95 \leq w < 1$, however, are stable with respect to kinetic decomposition even in oxygen partial pressure gradients of well above 10 decades. Under certain additional requirements regarding the values of x and y of the enumerated formula, said compositions are characterized by stable oxygen flux not decreasing with time, and single phase unchanged membrane surfaces and interior. Examples of the performance of such compositions are presented in the present Examples 11, 13, and 14 and FIGS. 3, 5, 6, and 7.

Following the further limitations pointed out in the discussion hitherto, the membrane material possessing the perovskite structure for use in said processes, must have a composition represented by the formula $$La_{1-x}Ca_x(Fe_{1-y-y'}Ti_yAl_{y'})_wO_{3-d}$$

wherein x, y, y', w, and d each represent a number such that $0 \leq x \leq 1$, $0 \leq y \leq 1$, $0 \leq y' < 1$, $0 < (y+y') < 1$, $y \leq x$, $0.95 < w < 1$, and d equals a number that renders the compound charge neutral and is not less than zero and not greater than about 0.8.

The compositions represented by said formula can alternatively be represented by mixtures of y number of moles of $CaTi_wO_{3-d'}$ (CT), (x−y) number of moles of $CaFe_wO_{3-d''}$ (CF), (1−x−y) number of moles of $LaFe_wO_{3-d'''}$ (LF), and y' number of moles of $LaAl_wO_{3-d''''}$ (LA), with respective mole fractions given by $X_{CT}=y$, $X_{CF}=x-y$, $X_{LF}=1-x-y'$, and $X_{LA}=y'$. Graphically, said mixtures can be represented within a ternary phase diagram as shown in the present FIG. 14.

Compositions represented by said formula, and where the numbers x, y, and y' are selected such that (y+y')<0.1 and (x−y)≤0.3 are characterized by having high chemical expansion, and membranes of these compositions can probably not be used in said processes. Examples of the high chemical expansion of these materials are presented in the present Examples 18 and 19.

Compositions represented by said formula, and where the numbers x and y are selected such that (x−y)<0.05 are characterized by having low vacancy concentrations (d), which yield low oxygen flux rates, and membranes of these compositions can probably not be used in said processes. An example of the low oxygen flux of these compositions is provided in the present Example 23.

Compositions represented by said formula, and where the numbers x, y, and y' are selected such that either (y+y')>0.8, or (1−x−y')<0.05 and (x−y)≤0.3, are characterized by having low electronic conductivity, which yield low oxygen flux rates, and membranes of these compositions can probably not be used in said processes. An example of the low oxygen flux of these compositions is provided in the present Example 24.

Compositions represented by said formula, and where the numbers x and y are selected such that (x−y)>0.3, are not simple perovskites at conditions representative of said processes. The cations and oxygen vacancies of these compositions become ordered, during which ordering process the flux rates decrease to eventually reach too low permeation rates to be used as membranes in said processes. An example of the low oxygen flux of these compositions is provided in the present Example 25.

Compositions represented by said formula, and where the numbers x and y are selected such that $0.1 \leq (y+y') \leq 0.8$, $0.15 \leq (x+y') \leq 0.95$, and $0.05 \leq (x-y) \leq 0.3$ are characterized by having properties acceptable for use as membranes in said processes. These properties include low and acceptable chemical expansion below 0.1% (Examples 17 and 21), sufficiently high vacancy concentration to yield sufficient flux rates (Example 11), sufficiently high electronic conductivity to yield sufficient flux rates (Example 11), minor (acceptable) or no ordering of cations and oxygen vacancies (Examples 11, 13 and 14).

Compositions represented by said formula and where the numbers x and y are selected such that $0.1 \leq (y+y') \leq 0.8$, $0.15 \leq (x+y') \leq 0.95$, $0.05 \leq (x-y) \leq 0.3$, and y'>0, are characterized by a further reduction in the chemical expansion (Example 21).

Thus, the membrane material according to the present invention for use in said processes has a composition represented by the formula:

$$La_{1-x}Ca_x(Fe_{1-y-y'}Ti_yAl_{y'})_wO_{3-d}$$

wherein x, y, y', w, and d each represent a number such that $0.1 \leq (y+y') \leq 0.8$, $0.15 \leq (x+y') \leq 0.95$, $0.05 \leq (x-y) \leq 0.3$, $0.95<w<1$, and d equals a number that renders the compound charge neutral and is not less than zero and not greater than about 0.8.

Particularly suitable compositions according to the present invention are represented by said general formula wherein x, y, y', w, and d each represent a number such that $0.15<(y+y')<0.75$, $0.2<(x+y')<0.9$, $0.05<(x-y)<0.15$, $0.95<w<1$, and d equals a number that renders the compound charge neutral and is not less than zero and not greater than about 0.8.

Representative compositions include
$La_{0.65}Ca_{0.35}Fe_{0.63}Ti_{0.24}Al_{0.10}O_{3-d}$,
$La_{0.45}Ca_{0.55}Fe_{0.48}Ti_{0.39}Al_{0.10}O_{3-d}$,
$La_{0.4}Ca_{0.6}Fe_{0.49}Ti_{0.43}Al_{0.05}O_{3-d}$,
$La_{0.58}Ca_{0.42}Fe_{0.63}Ti_{0.31}Al_{0.03}O_{3-d}$,
$La_{0.4}Ca_{0.6}Fe_{0.485}Ti_{0.485}O_{3-d}$, $La_{0.55}Ca_{0.45}Fe_{0.63}Ti_{0.34}O_{3-d}$,
$La_{0.68}Ca_{0.32}Fe_{0.73}Ti_{0.25}O_{3-d}$ and
$La_{0.22}Ca_{0.78}Fe_{0.34}Ti_{0.62}O_{3-d}$.

The improvements afforded by the applicants' invention can be best appreciated by a comparison of properties, such as structure, performance during oxygen permeation, phase composition after permeation etc., of the claimed non-stoichiometric compositions with the prior art stoichiometric compositions.

The invention will be further explained and envisaged in the examples and the figures.

EXAMPLE 1

Preparation of $La_{0.4}Ca_{0.6}Fe_{0.485}Ti_{0.485}O_{3-d}$

A solid mixed conducting membrane was prepared by a soft chemistry route wherein the appropriate amounts of $La_2O_3$, $CaCO_3$, and titanyl acetylacetonate were first dissolved in nitric acid. To this liquid mixture was added the appropriate amount of a preprepared standardized 1M aqueous solution of $Fe(NO_3)_3$. To the mixture was added citric acid in excess, and excess water was evaporated for 3 hours at 90° C., during which time complexation takes place. The resulting gel was pyrolyzed in air for 14 hours by heating to 140° C., whereupon the resulting dry powder was calcined at 500° C. for 2 hours and 900° C. for 10 hours. The powder mixture was then combined with a binder and uniaxially cold pressed to a 13 mmø disk at 180 MPa. The resulting porous disk was heated to 500° C. at 5°/min to allow controlled combustion of the binder, and then further heated to 1250° C., maintained at 1250° C. for 3 hours and cooled to room temperature. This procedure yielded a 10 mmø gas tight disk with>96% of theoretical density. The membrane was polished on both sides to a 1 micron surface finish and 1.66 mm thickness. The formula representing the product may be expressed as $La_{0.4}Ca_{0.6}Fe_{0.485}Ti_{0.485}O_{3-d}$.

EXAMPLE 2 (COMPARATIVE)

Preparation of $La_{0.4}Ca_{0.6}Fe_{0.5}Ti_{0.5}O_{3-d}$

A solid mixed conducting membrane was prepared according to the method of Example 1 except the amounts of the reactants were chosen to yield a product that may be represented by the formula $La_{0.4}Ca_{0.6}Fe_{0.5}Ti_{0.5}O_{3-d}$. The membrane was polished on both sides to a 1 micron surface finish and 1.00 mm thickness.

EXAMPLE 3 (COMPARATIVE)

Preparation of $La_{0.2}Sr_{0.8}Fe_{0.8}Cr_{0.1}Co_{0.1}O_{3-d}$

A solid mixed conducting membrane was prepared by a soft chemistry route wherein the appropriate amounts of $La_2O_3$ and $Sr(NO_3)_2$ were first dissolved in nitric acid. To this liquid mixture was added the appropriate amounts of preprepared standardized 1M aqueous solutions of $Fe(NO_3)_3$, $Cr(NO_3)_3$, and $Co(NO_3)_2$. To the mixture was added citric acid in excess, and excess water was evaporated for 3 hours at 90° C., during which time complexation takes place. The resulting gel was pyrolyzed in air for 14 hours by heating to 140° C., whereupon the resulting dry powder was calcined at 500° C. for 2 hours and 900° C. for 10 hours. The powder mixture was then combined with a binder and uniaxially cold pressed to a 13 mmø disk at 180 MPa. The resulting porous disk was heated to 500° C. at 5°/min to allow controlled combustion of the binder, and then further heated to 1200° C., maintained at 1200° C. for 3 hours and cooled to room temperature. This procedure yielded a 10 mmø gas tight disk with >96% of theoretical density. The membrane was polished on both sides to a 1 micron surface finish and 1.5 mm thickness. The formula representing the product may be expressed as $La_{0.2}Sr_{0.8}Fe_{0.8}Cr_{0.1}Co_{0.1}O_{3-d}$.

EXAMPLE 4

Preparation of $La_{0.55}Ca_{0.45}Fe_{0.63}Ti_{0.34}O_{3-d}$

A solid mixed conducting membrane was prepared according to the method of Example 1 except the amounts of the reactants were chosen to yield a product that may be represented by the formula $La_{0.55}Ca_{0.45}Fe_{0.63}Ti_{0.34}O_{3-d}$. The membrane was polished on both sides to a 1 micron surface finish and 1.42 mm thickness.

EXAMPLE 5

Preparation of $La_{0.3}Ca_{0.7}Fe_{0.485}Ti_{0.485}O_{3-d}$

A solid mixed conducting membrane was prepared according to the method of Example 1 except the amounts of the reactants were chosen to yield a product that may be represented by the formula $La_{0.3}Ca_{0.7}Fe_{0.485}Ti_{0.485}O_{3-d}$. The membrane was polished on both sides to a 1 micron surface finish and 1.46 mm thickness.

EXAMPLE 6 (COMPARATIVE)

Preparation of $La_{0.8}Ca_{0.2}FeO_{3-d}$

A solid mixed conducting membrane was prepared according to the method of Example 1 except titanium acetylacetonate was omitted and the amounts of the other reactants were chosen to yield a product that may be represented by the formula $La_{0.8}Ca_{0.2}FeO_{3-d}$. The membrane was ground to a square of approximately 8×8 mm and polished on both sides to a 1 micron surface finish.

EXAMPLE 7 (COMPARATIVE)

Preparation of $La_{0.6}Ca_{0.4}Fe_{0.777}Ti_{0.194}O_{3-d}$

A solid mixed conducting membrane was prepared according to the method of Example 1 except the amounts of the reactants were chosen to yield a product that may be represented by the formula $La_{0.6}Ca_{0.4}Fe_{0.777}Ti_{0.194}O_{3-d}$. The membrane was ground to a square of approximately 8×8 mm and polished on both sides to a 1 micron surface finish.

EXAMPLE 8 (COMPARATIVE)

Preparation of $La_{0.2}Ca_{0.8}Mn_{0.4}Ti_{0.6}O_{3-d}$

A solid mixed conducting membrane was prepared according to the method of Example 1 except manganese nitrate solution was substituted for iron nitrate solution and the amounts of the reactants were chosen to yield a product that may be represented by the formula $La_{0.2}Ca_{0.8}Mn_{0.4}Ti_{0.6}O_{3-d}$. The membrane was ground to a square of approximately 8×8 mm and polished on both sides to a 1 micron surface finish.

EXAMPLE 9

Preparation of $La_{0.65}Ca_{0.35}Fe_{0.63}Ti_{0.24}Al_{0.10}O_{3-d}$

A solid mixed conducting membrane was prepared according to the method of Example 1 except aluminium acetylacetonate was added in addition to the other components and the amounts of the reactants were chosen to yield a product that may be represented by the formula $La_{0.65}Ca_{0.35}Fe_{0.63}Ti_{0.24}Al_{0.10}O_{3-d}$. The membrane was polished on both sides to a 1 micron surface finish and 1.5 mm thickness.

EXAMPLE 10

Figure 2:
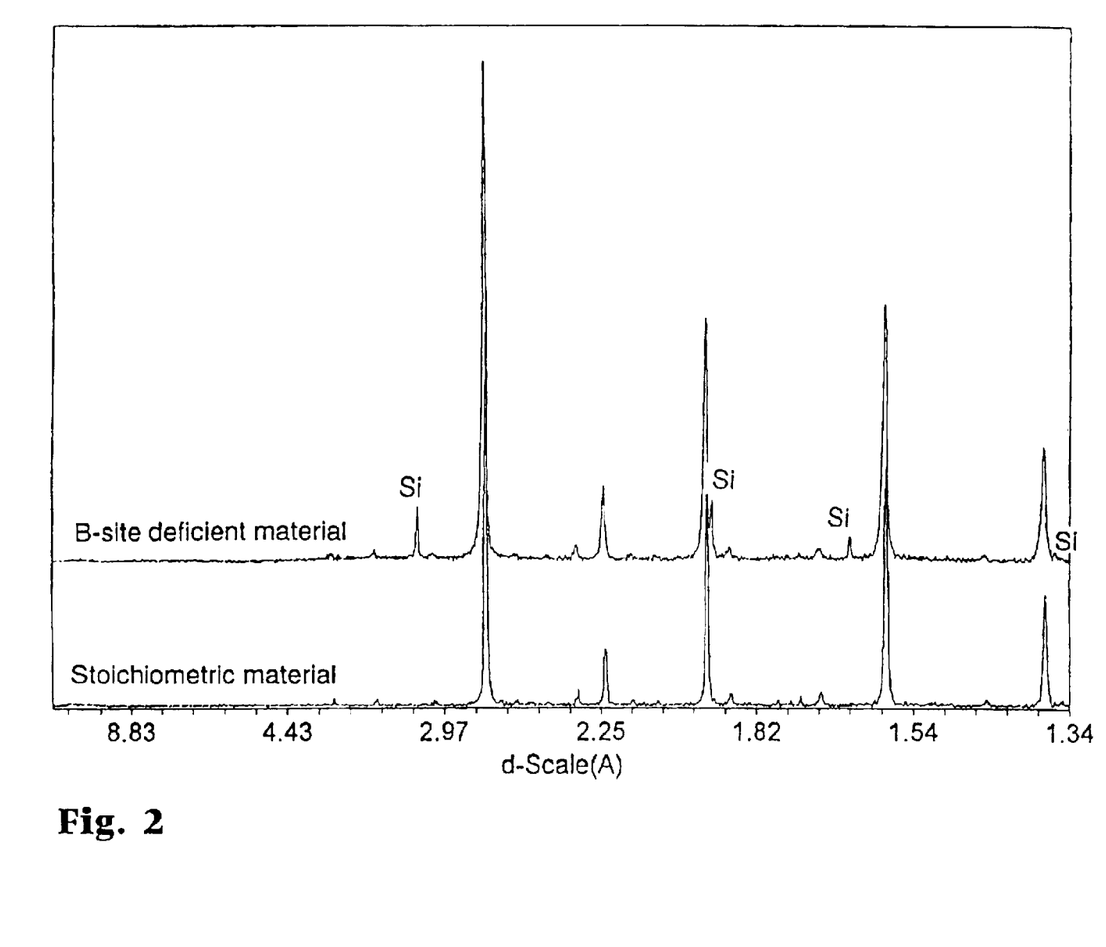
FIG. 2 shows X-ray diffractograms of the B-site deficient membrane material of Example 1 and the cation stoichiometric membrane material of Example 2.

Structure of $La_{0.4}Ca_{0.6}Fe_{0.485}Ti_{0.485}O_{3-d}$ and $La_{0.4}Ca_{0.6}Fe_{0.5}Ti_{0.5}O_{3-d}$ XRD diffractograms of the mixed conducting membrane materials of Examples 1 ("B-site deficient") and 2 ("Stoichiometric") are shown in FIG. 2. Both materials are single phase and possess the perovskite structure. Peaks marked "Si" in the diffractogram of the B-site deficient material belong to silicon, which was added as an internal XRD-standard. A slight shift of the peak locations to lower diffraction angles in the B-site deficient material shows that the unit cell volume is increased by introduction of B-site deficiency.

EXAMPLE 11

Oxygen Permeation Test of a Dense Mixed Conducting $La_{0.4}Ca_{0.6}Fe_{0.485}Ti_{0.485}O_{3-d}$ Membrane The mixed conducting membrane disk of Example 1 was attached to an alumina tube by placing one gold ring between the membrane and the alumina tube and one gold ring between the membrane and a quartz support structure. The membrane assembly was heated to 1031° C. where the gold softened and a seal formed between the membrane and the alumina tube. 250 ml/min (STP) of a mixture of 50% oxygen and 50% nitrogen was flushed across the outside (high $p_{O2}$ or primary) surface of the membrane.

In the first part of the test, 250 ml/min (STP) of He was flushed across the inside (low $p_{O2}$ or secondary) surface of the membrane. Oxygen permeated through the membrane from the high $p_{O2}$ side to the low $p_{O2}$ side and was entrained by the He sweep gas stream. The oxygen concentration in the exiting helium stream was analyzed by gas chromatography. Small leakages due to imperfections in the gold ring seal were detected by analyzing the exiting helium stream for nitrogen. The oxygen flux was calculated by the following formula:

$$J_{O_2} = (X_{O_2} - X_{N_2}) \cdot \frac{F_{tot}}{A_{mem}}$$

where $J_{O_2}$ is the oxygen flux per membrane area, $X_{O_2}$ is the mole fraction of $O_2$ in the exiting He sweep stream, $X_{N_2}$ is the mole fraction of $N_2$ in the exiting He sweep stream, $F_{tot}$ is the total flow rate of gas exiting the low $P_{O2}$ compartment of the oxygen permeation cell, and $A_{mem}$ is the active area of the membrane. During the first part of the experiment, the oxygen flux was determined at several temperatures between 880° C. and 1050° C.

During the second part of the experiment, 250 ml/min of a sweep gas consisting of 97.5% by volume of He and 1.25% by volume each of CO and $CO_2$ was flushed across the low $p_{O2}$ surface of the membrane. Oxygen permeated through the membrane from the high $p_{O2}$ side to the low $p_{O2}$ side and combined with CO on the low $P_{O2}$ side to form $CO_2$. The concentrations of $O_2$, $N_2$, CO and $CO_2$ in the exiting gas stream were analyzed by gas chromatography. The oxygen flux was calculated by the formula:

$$J_{O_2} = \left[ \frac{X_{CO_2} - \frac{X^0_{CO_2}}{X^0_{CO}} \cdot X_{CO}}{2 \cdot \frac{X^0_{CO_2}}{X^0_{CO}} + 2} - X_{N_2} \right] \cdot \frac{F_{tot}}{A_{mem}}$$

where $J_{O_2}$ is the oxygen flux per membrane area, $X_{CO_2}$ is the mole fraction of $CO_2$ in the exiting He sweep stream, $X_{CO}$ is the mole fraction of CO in the exiting He sweep stream, $X^0_{CO_2}$ is the mole fraction of $CO_2$ in the entering He sweep stream, $X^0_{CO}$ is the mole fraction of CO in the entering He sweep stream, $X_{N_2}$ is the mole fraction of $N_2$ in the exiting He sweep stream, F is the total flow rate of the gas stream exiting the low $P_{O2}$ compartment of the oxygen permeation cell, and $A_{mem}$ is the active area of the membrane. During the second part of the experiment, the oxygen flux was determined at several temperatures between 880° C. and 1050° C.

During the third part of the experiment, a pure He stream of 250 ml/min was flushed across the low $P_{O2}$ side of the membrane, and the oxygen flux was determined in the same manner as during the first part of the experiment. The oxygen flux was determined at several temperatures.

Figure 3:
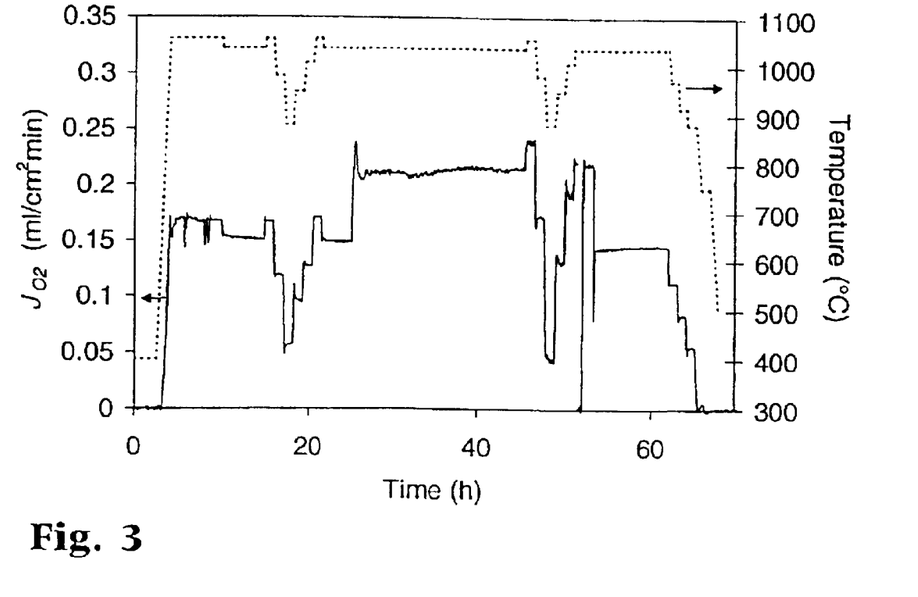
FIG. 3 shows oxygen permeation characteristics of the membrane material of Example 1.

FIG. 3 shows the oxygen flux (left abscissa, fully drawn line) and the temperature (right abscissa, dashed line) as function of time during the oxygen permeation test. The first part of the test takes place in the period from 4 hours to 26 hours, the second part from 26 hours to 53 hours, and the third part from 53 hours to 70 hours. The oxygen flux does not vary substantially with time at constant temperature. The oxygen flux during the second part of the test calculated for 1000° C. and 1 mm membrane thickness was 0.30 ml/(cm²min).

EXAMPLE 12 (COMPARATIVE)

Oxygen Permeation Test of a Dense Mixed Conducting $La_{0.4}Ca_{0.6}Fe_{0.5}Ti_{0.5}O_{3-d}$ Membrane An oxygen permeation test was conducted according to the procedure described in Example 11, except the membrane disk of Example 2 was used.

Figure 4:
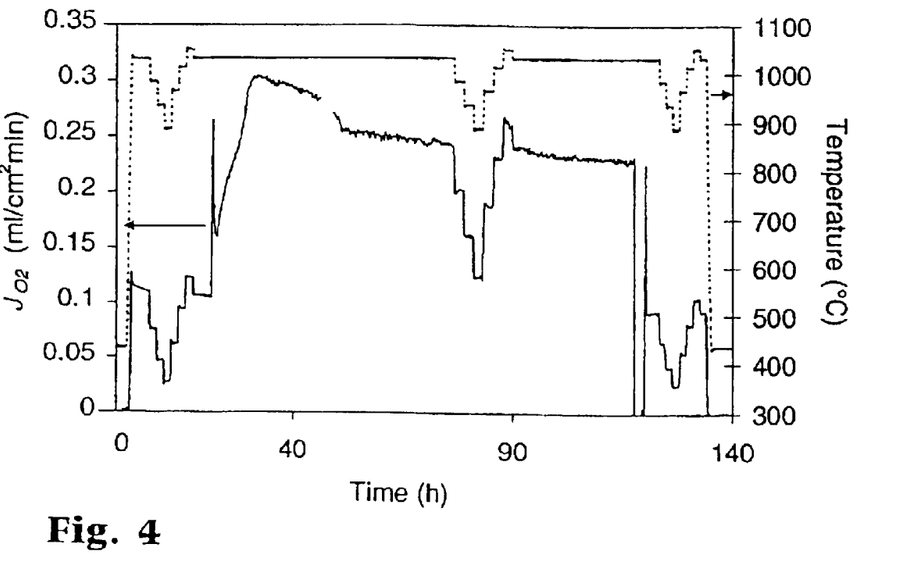
FIG. 4 shows oxygen permeation characteristics of the membrane material of Example 2.

FIG. 4 shows the oxygen flux (left abscissa, fully drawn line) and the temperature (right abscissa, dashed line) as function of time during the oxygen permeation test. The first part of the test takes place in the period from 4 hours to 24 hours, the second part from 24 hours to 118 hours, and the third part from 118 hours to 135 hours. The oxygen flux decreases with time at a constant temperature during the first part of the test. During the second part of the test, there is first an apparent increase in the oxygen flux, then a decrease. The oxygen flux during the quasi-steady state period of the second part of the test calculated for 1000° C. and 1 mm membrane thickness was 0.21 ml/(cm²min).

EXAMPLE 13

Figure 5:
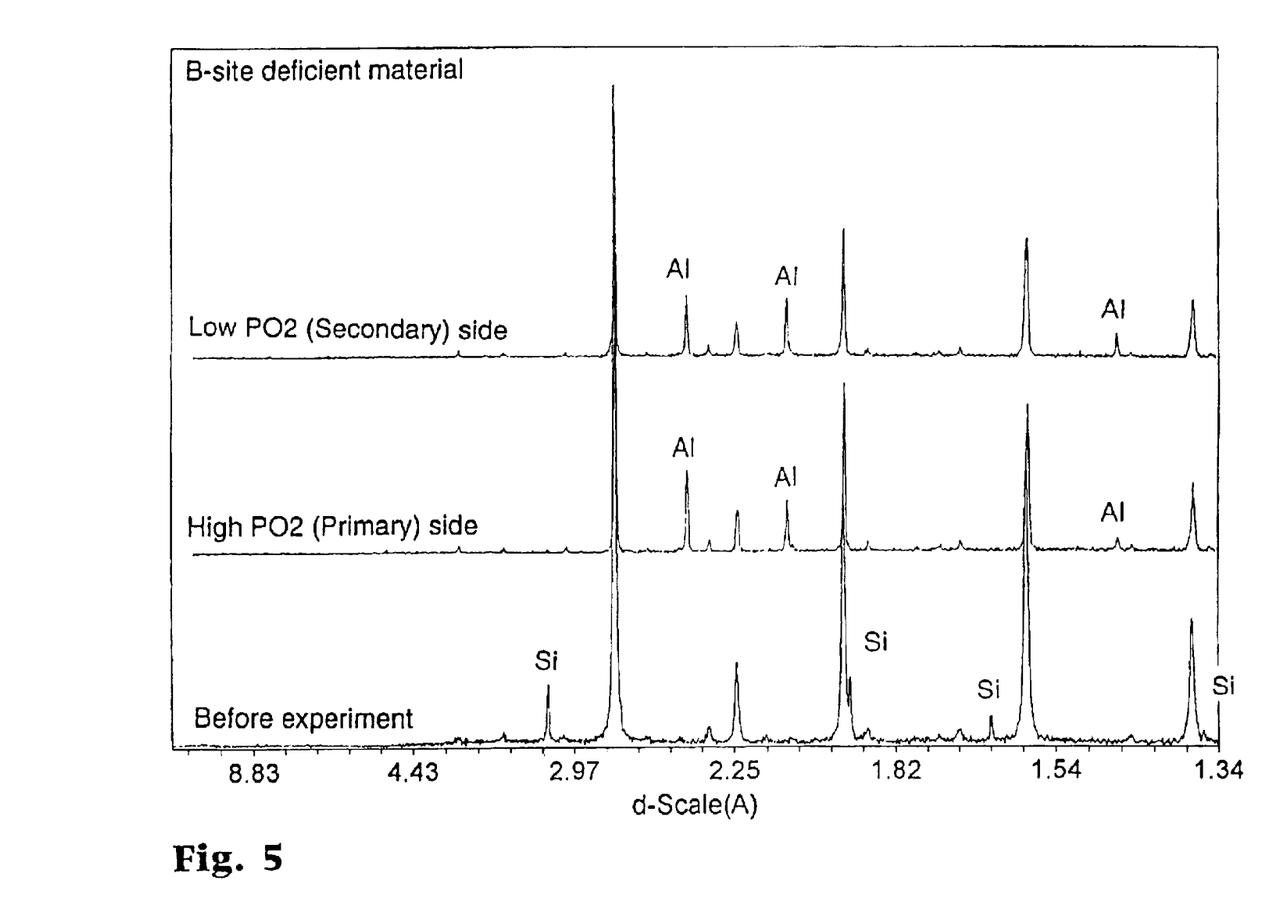
FIG. 5 shows X-ray diffractograms of the membrane material of Example 1 before and after the oxygen permeation experiment of Example 11.

Structure of $La_{0.4}Ca_{0.6}Fe_{0.485}Ti_{0.485}O_{3-d}$ After Oxygen Flux Testing The membrane of Example 1, tested for oxygen flux in Example 11, was examined by X-ray diffraction on both sides. FIG. 5 shows X-ray diffractograms of the material prior to the experiment (bottom) and of the two surfaces of the membrane after the oxygen permeation test; the high $p_{O2}$ surface (middle) and the low $p_{O2}$ surface (top). The peaks labelled "Si" belong to silicon which was added to the sample as an internal standard. The peaks labelled "Al" belong to the aluminium sample holder. The sample possesses the perovskite structure and is single phase. It shows no evidence of decomposition after the oxygen flux experiment.

EXAMPLE 14

Figure 6:
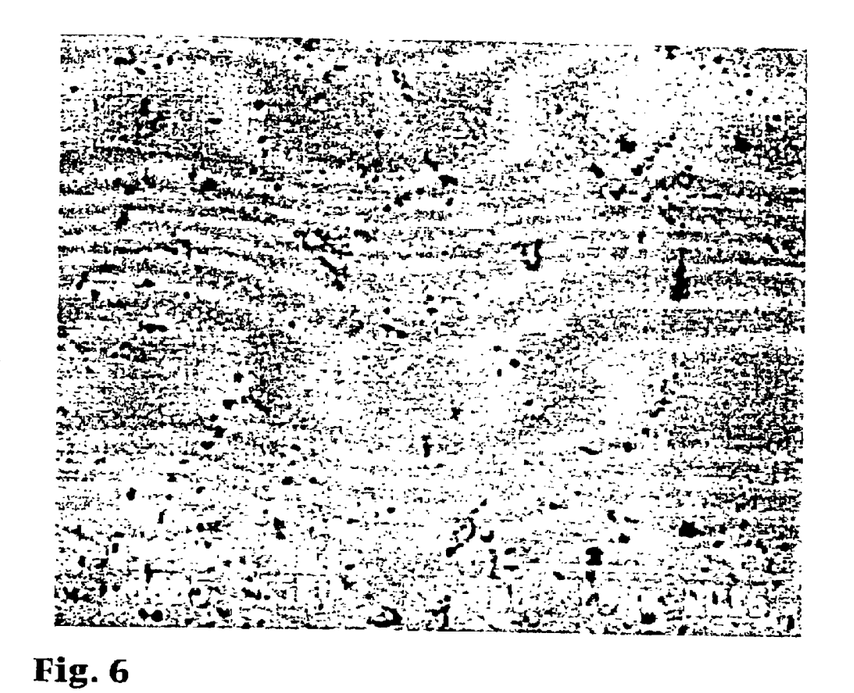
FIG. 6 shows a scanning electron micrograph of the high oxygen partial pressure (primary) side of the membrane material of Example 4 after an oxygen permeation experiment.
Figure 7:
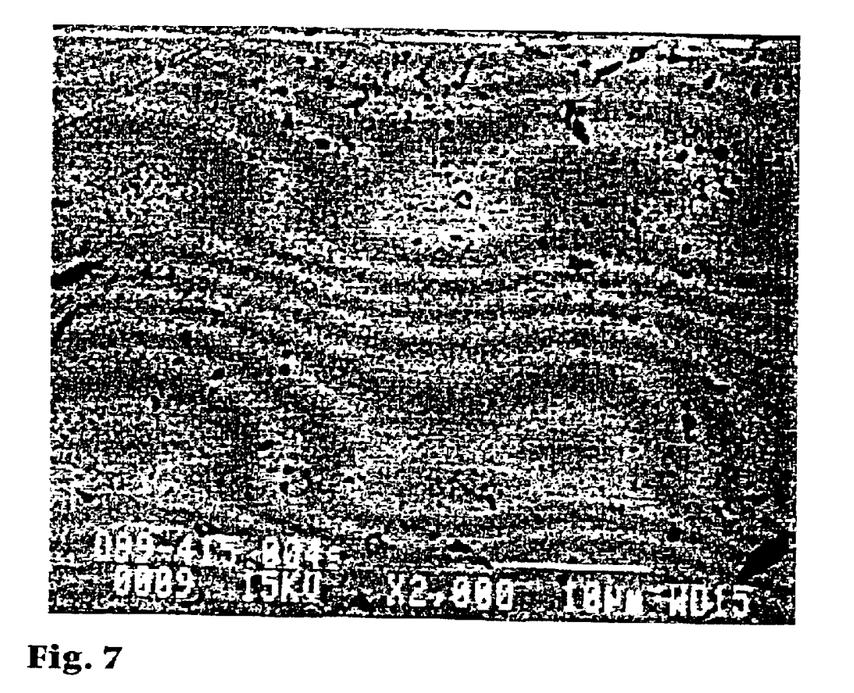
FIG. 7 shows a scanning electron micrograph of the low oxygen partial pressure (secondary) side of the membrane material of Example 4 after an oxygen permeation experiment.

Structure of $La_{0.55}Ca_{0.45}Fe_{0.63}Ti_{0.34}O_{3-d}$ After Oxygen Flux Testing The material prepared in Example 4 was examined by Scanning Electron Microscopy after an oxygen flux test. Representative pictures of the high $p_{O2}$ side and the low $p_{O2}$ side are shown in FIG. 6 and FIG. 7, respectively. The micro-structure is fine-grained and homogeneous with no apparent difference between the two sides of the membrane. Semi-quantitative elemental analysis by EDS shows that the composition of the material is essentially unchanged from before the oxygen flux test.

EXAMPLE 15 (COMPARATIVE)

Structure of $La_{0.4}Ca_{0.6}Fe_{0.5}Ti_{0.5}O_{3-d}$ After Oxygen Flux Testing The membrane of Example 2 was examined by X-ray diffraction and Scanning Electron Microscopy after the oxygen flux test of Example 12.

Figure 8:
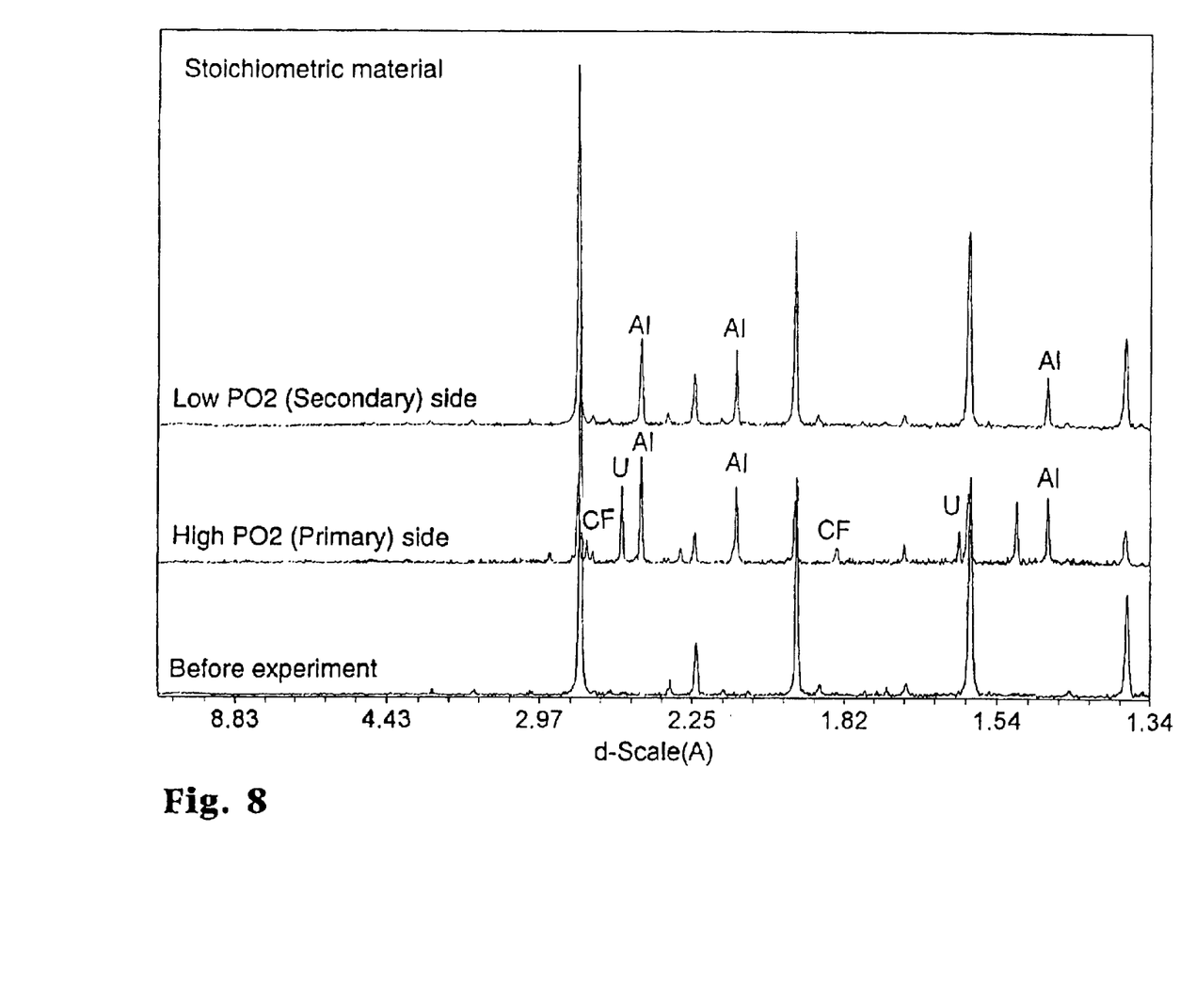
FIG. 8 shows X-ray diffractograms of the membrane material of Example 2 before and after the oxygen permeation experiment of Example 12.

FIG. 8 shows X-ray diffractograms of the material prior to the experiment (bottom) and of the two surfaces of the membrane after the oxygen permeation test; the high $p_{O2}$ surface (middle) and the low $p_{O2}$ surface (top). The peaks labelled "Al" belong to the aluminium sample holder. Before the experiment, the sample possesses the perovskite structure and is single phase. The X-ray diffractogram of the high $p_{O2}$ surface after the oxygen flux tests shows the presence of additional phases, of which one was identified as $CaFe_2O_4$. Peaks labelled "CF" in the X-ray diffractogram belong to this phase. Peaks labelled "U" belong to an unidentified phase. Unlabelled peaks belong to the perovskite phase. The X-ray diffractogram of the low $p_{O2}$ side after the oxygen permeation test shows essentially no change from the sample before the test.

Figure 9:
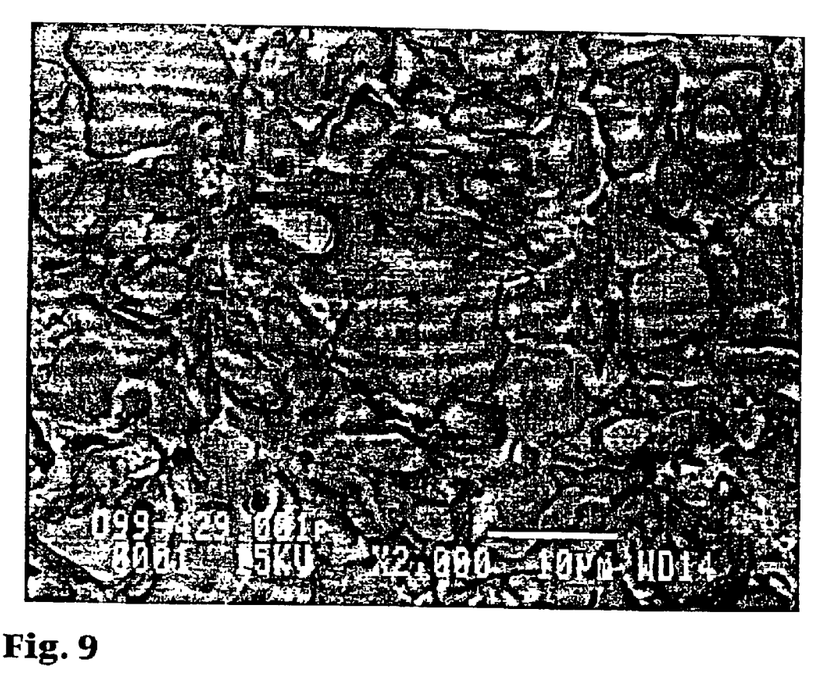
FIG. 9 shows a scanning electron micrograph of the high oxygen partial pressure (primary) side of the membrane material of Example 2 after the oxygen permeation experiment of Example 12.
Figure 10:
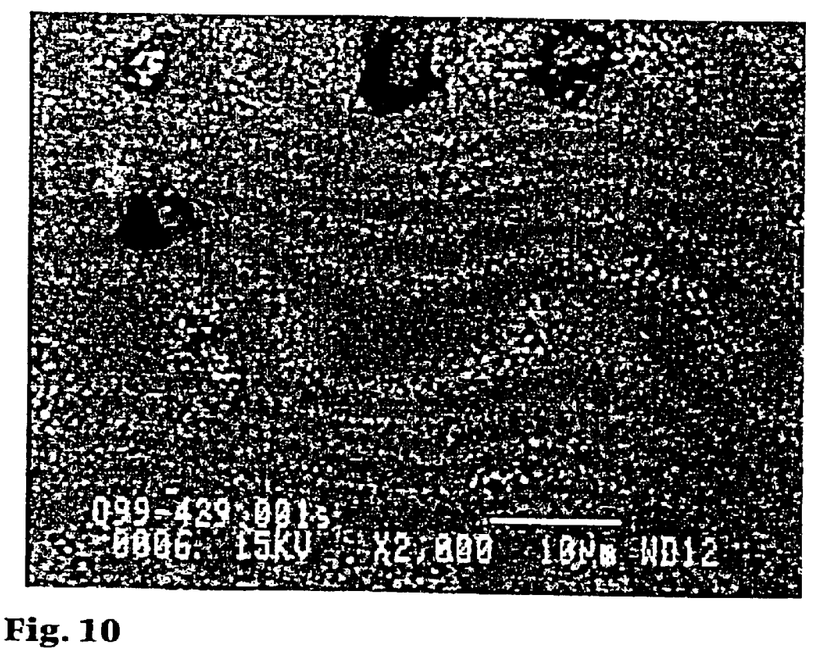
FIG. 10 shows scanning electron micrograph of the low oxygen partial pressure (secondary) side of the membrane material of Example 2 after the oxygen permeaton experiment of Example 12.

FIG. 9 and FIG. 10 show representative Scanning Electron Micrographs of the high $p_{O2}$ and low $p_{O2}$ surfaces of the membrane after the oxygen flux test, respectively. FIG. 9 shows that the high $p_{O2}$ surface of the membrane is covered by a continuous layer of decomposition phases. Semiquantitative elemental analysis by EDS indicates that this layer consists of $CaFe_2O_4$ and an iron oxide. FIG. 10 shows that the low $p_{O2}$ surface is fine grained and homogeneous. Semi-quantitative elemental analysis by EDS indicates that the composition is essentially unchanged from before the experiment.

EXAMPLE 16

Structure of $La_{0.3}Ca_{0.7}Fe_{0.485}Ti_{0.485}O_{3-d}$ After Oxygen Flux Testing The membrane of Example 5 was examined by X-ray diffraction and Scanning Electron Microscopy after an oxygen flux test.

Figure 11:
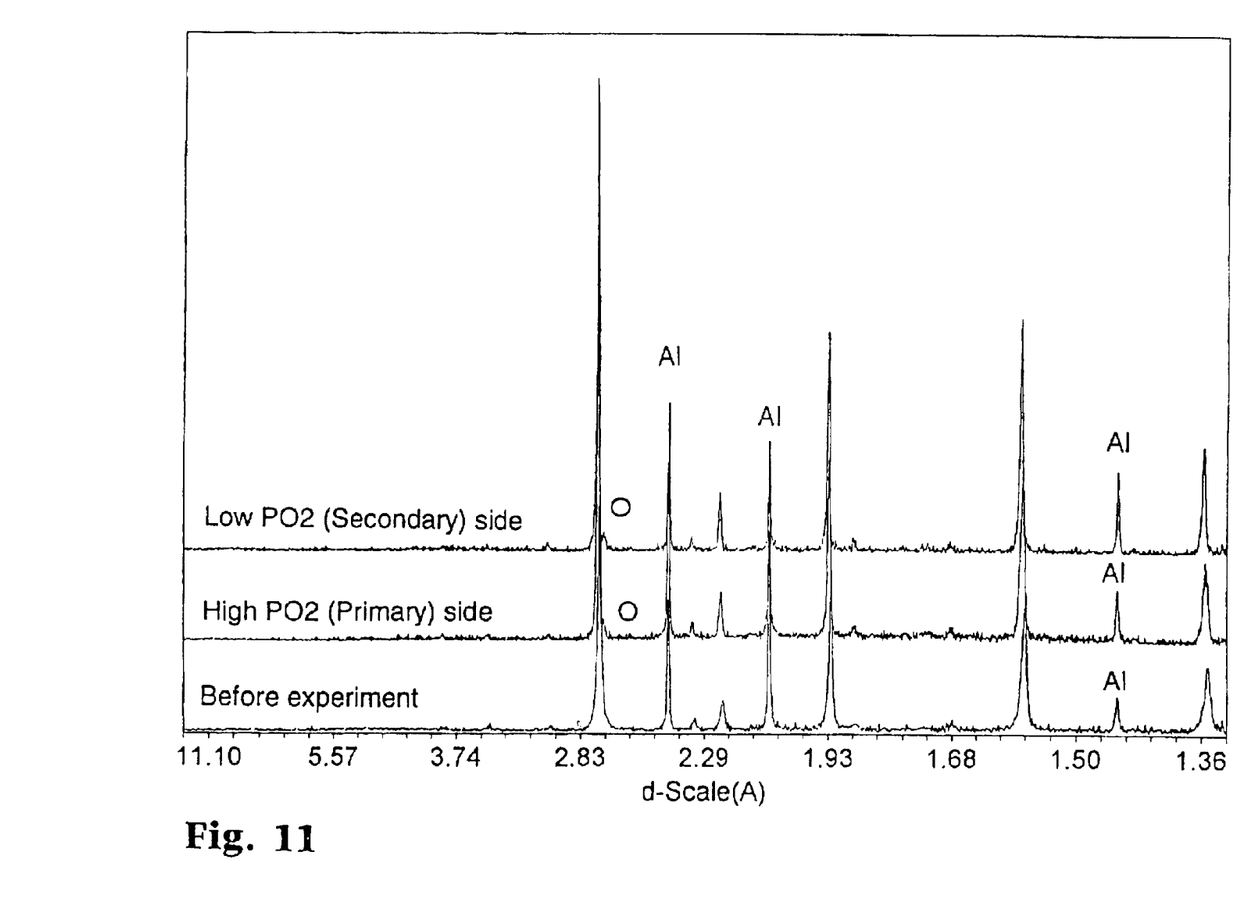
FIG. 11 shows X-ray diffractograms of the membrane material of Example 5 before and after an oxygen permeation experiment.

FIG. 11 shows X-ray diffractograms of the material prior to the experiment (bottom) and of the two surfaces of the membrane after the oxygen permeation test; the high $p_{O2}$ surface (middle) and the low $p_{O2}$ surface (top). The peaks labelled "Al" belong to the aluminium sample holder. Before the experiment, the sample possesses the perovskite structure and is single phase. After the experiment, an additional minor peak appears at d=2.7 Å. This peak is attributed to an ordered structure similar to the known phases $LaCa_2Fe_3O_8$ and $Ca_3Ti_2FeO_8$.

Figure 12:
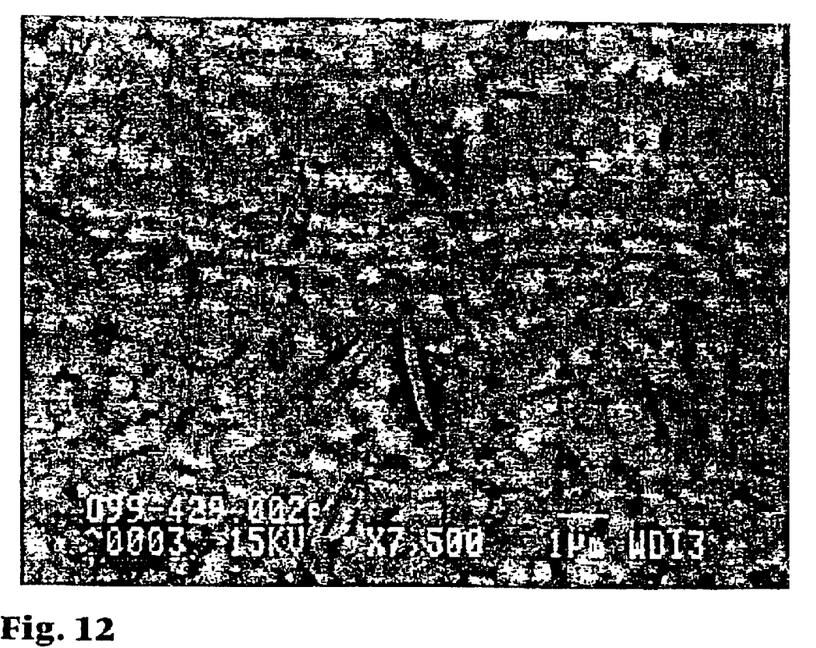
FIG. 12 shows a scanning electron micrograph of the high oxygen partial pressure (primary) side of the membrane material of Example 5 after an oxygen permeation experiment.
Figure 13:
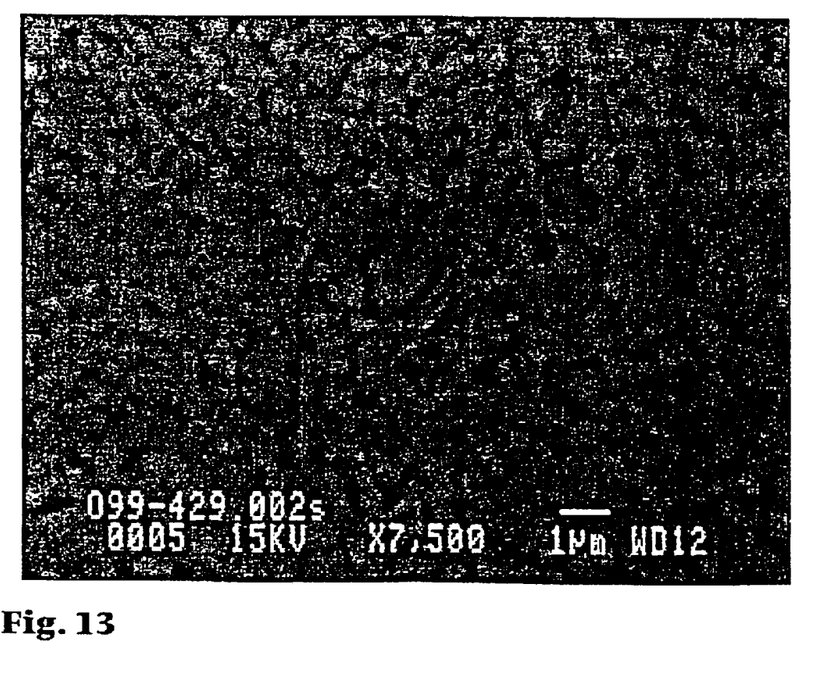
FIG. 13 shows a scanning electron micrograph of the low oxygen partial pressure (secondary) side of the membrane material of Example 5 after an oxygen permeation experiment.

FIG. 12 and FIG. 13 show representative Scanning Electron Micrographs of the high $p_{O2}$ and low $p_{O2}$ surfaces of the membrane after the oxygen flux test, respectively. The microstructure is essentially the same on both surfaces. The matrix phase consists of rounded grains up to about 1 micron in size. Semiquantitative elemental analysis by EDS indicates that this phase is essentially identical to the material before the oxygen flux test. A secondary phase consisting of elongated grains of up to 3 microns in length and less than 0.5 micron in width is also found on both surfaces of the membrane. Semi-quantitative elemental analysis by EDS indicates that this phase has the molar ratio (La+Ca):(Fe+Ti) of close to unity, characteristic of the perovskites. The phase is enriched in Ca and Fe and depleted in La and Ti relative to the bulk of the material. This is consistent with the formation of a phase with an ordered structure similar to the known phases $LaCa_2Fe_3O_8$ and $Ca_3Ti_2FeO_8$.

EXAMPLE 17

Thermal and Chemical Expansion of $La_{0.45}Ca_{0.55}Fe_{0.63}Ti_{0.34}O_{3-d}$

A solid mixed conducting membrane was prepared according to the method of Example 4 except the membrane disk was ground into a square of approximately 8×8 mm. This specimen was placed in a dilatometer, and heated at a rate of 6° C./min in a flowing air atmosphere to 997° C. The average thermal expansion coefficient measured between 400° C. and 997° C. was $11.8*10^{-6}$ $K^{-1}$. The sample was maintained at 997° C. for several hours, whereupon the atmosphere was changed to a flowing mixture of 95% $N_2$, 1% CO and 4% $CO_2$. The sample was allowed to expand to its equilibrium length. The atmosphere was then changed back to flowing air, whereupon the sample, still maintained at 997° C. was allowed to contract to its equilibrium length. The relative difference in length is referred to as the chemical expansion, and was 0.06%.

EXAMPLE 18 (COMPARATIVE)

Thermal and Chemical Expansion of $La_{0.8}Ca_{0.2}FeO_{3-d}$

The membrane of Example 6 was tested by the procedure of Example 17, except the temperature of the measurement was 1005° C. The average thermal expansion coefficient measured between 400° C. and 1000° C. was $11.1*10^{-6}$ $K^{-1}$. The chemical expansion was 0.15%.

EXAMPLE 19 (COMPARATIVE)

Thermal and Chemical Expansion of $La_{0.6}Ca_{0.4}Fe_{0.777}Ti_{0.194}O_{3-d}$

The membrane of Example 7 was tested by the procedure of Example 17, except the temperature of the measurement was 994° C. The average thermal expansion coefficient measured between 400° C. and 1000° C. was $12.3*10^{-6}$ $K^{-1}$. The chemical expansion was 0.12%.

EXAMPLE 20 (COMPARATIVE)

Thermal and Chemical Expansion of $La_{0.2}Ca_{0.3}Mn_{0.4}Ti_{0.6}O_{3-d}$

The membrane of Example 8 was tested by the procedure of Example 17, except the temperature of the measurement was 1000° C. The average thermal expansion coefficient measured between 400° C. and 1000° C. was $11.6*10^{-6}$ $K^{-1}$. The chemical expansion was 0.38%.

EXAMPLE 21 (COMPARATIVE)

Thermal and Chemical Expansion of $La_{0.65}Ca_{0.35}Fe_{0.63}Ti_{0.24}Al_{0.10}O_{3-d}$ The membrane of Example 9 was tested by the procedure of Example 17, except the temperature of the measurement was 995° C. The average thermal expansion coefficient measured between 400° C. and 990° C. was $11.1*10^{-6}$ $K^{-1}$. The chemical expansion was less than 0.01%.

EXAMPLE 22 (COMPARATIVE)

Thermal and Chemical Expansion of $La_{0.15}Sr_{0.85}Fe_{0.8}Cr_{0.10}Co_{0.10}O_{3-d}$ The membrane of Example 3 was tested by the procedure of Example 17, except the temperature of the measurement was 996° C. The average thermal expansion coefficient measured between 400° C. and 990° C. was $17.0*10^{-6}$ $K^{-1}$. The chemical expansion was 0.27%.

EXAMPLE 23

Figure 14:
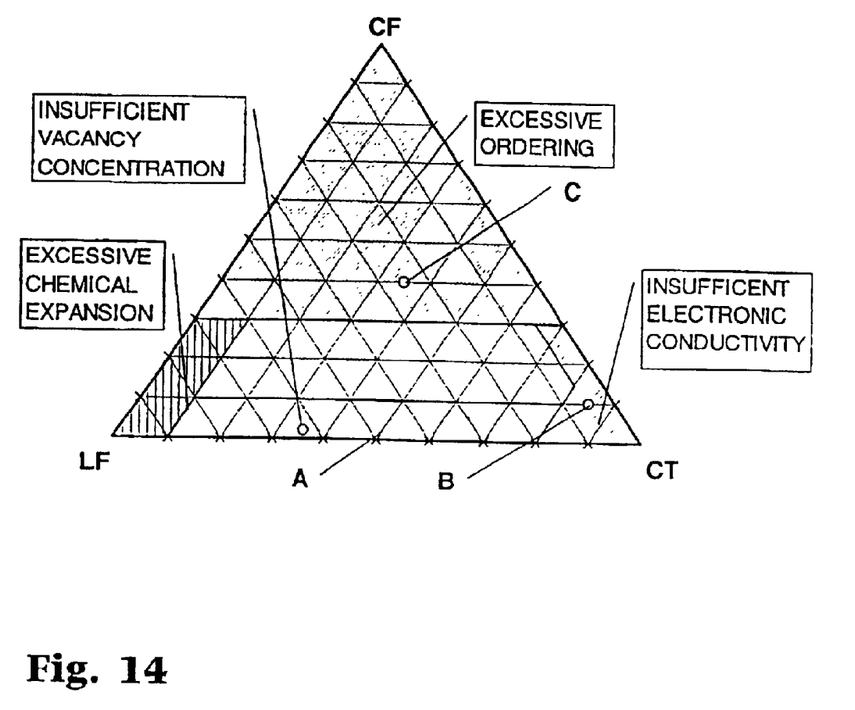
FIG. 14 shows the range of the claimed compositions represented in a ternary diagram as mixtures of $LaFe_{1-\nu}O_3$ (LF), $CaTi_{1-\nu}O_3$ (CT), $LaAl_{1-\nu}O_3$ (LA) and $CaFe_{1-\nu}O_{2.5}$ (CF).

Oxygen Permeation Test of a $La_{0.63}Ca_{0.37}Fe_{0.63}Ti_{0.34}O_{3-d}$ Membrane An oxygen permeation test is conducted according to the procedure described in Example 11, except a membrane disk of a composition represented by the formula $La_{0.63}Ca_{0.37}Fe_{0.63}Ti_{0.34}O_{3-d}$, is used. FIG. 14 shows a ternary diagram of the system $LaFe_wO_{3-d''}CaTi_wO_{3-d''}CaFe_wO_{3-d''}$. The composition is located near the $LaFe_wO_{3-d''}CaTi_wO_{3-d''}$ join of the ternary system, at the point marked "A". Compositions near the $LaFe_wO_{3-d''}CaTi_wO_{3-d''}$ join are characterised by a low concentration of oxygen vacancies, especially on the high $p_{O2}$ side of the membrane. Low oxygen flux is obtained with this material.

EXAMPLE 24

Oxygen Permeation Test of $La_{0.85}Ca_{0.95}Fe_{0.145}Ti_{0.825}O_{3-d}$ Membrane An oxygen permeation test is conducted according to the procedure described in Example 11, except a membrane disk of a composition represented by the formula $La_{0.05}Ca_{0.95}Fe_{0.145}Ti_{0.825}O_{3-d}$ is used. FIG. 14 shows a ternary diagram of the system $LaFe_wO_{3-d''}CaTi_wO_{3-d''}CaFe_wO_{3-d''}$. The composition of the material is located near the $CaTi_wO_{3-d''}$ apex of the ternary system, at the point marked "B". Low electronic conductivity, especially at low oxygen partial pressures is characteristic of materials with compositions in this region, and a low oxygen flux is measured.

EXAMPLE 25

Oxygen Permeation Test of $La_{0.25}Ca_{0.75}Fe_{0.63}Ti_{0.34}O_{3-d}$ Membrane

An oxygen permeation test is conducted according to the procedure described in Example 11, except a membrane disk of a composition represented by the formula $La_{0.25}Ca_{0.75}Fe_{0.63}Ti_{0.34}O_{3-d}$ is used. FIG. 14 shows a ternary diagram of the system $LaFe_wO_{3-d''}CaTi_wO_{3-d''}CaFe_wO_{3-d''}$. The composition of the material is located near the centre of the ternary system, at the point marked "C". Ordering of oxygen vacancies and cations is characteristic of materials within the system with compositions with $CaFe_wO_{3-d''}$ content higher than a limit depending on the temperature and oxygen partial pressure. The obtained oxygen flux decreases with time as the ordered phase forms.

These Examples demonstrate that the oxygen separation membranes of the present invention are particularly suitable as membrane materials in processes in which the membrane is subjected to a large potential gradient, e.g. oxygen partial pressure difference of 6–7 orders of magnitude or more across the membrane. Compared with compositions known in the prior art, these compositions offer improved resistance to kinetic decomposition and reduced chemical expansion, as well as improved stability against reduction to metal and reaction with carbon dioxide and water.

What is claimed is:

1. A solid multicomponent membrane for use in a reactor wherein the membrane comprises a mixed metal oxide having a structure represented by the formula:

$$(La_{1-x}Ca_x)_v(Fe_{1-y-y'}Ti_yAl_{y'})_wO_{3-d}$$

wherein x, y, y', w, v and d each represent a number such that $0.1 \leq (y+y') \leq 0.8$, $0.15 \leq (x+y') \leq 0.95$, $0.05 \leq (x-y) \leq 0.3$, $0.95 \leq w < 1$, $v=1$, $y'>0$ and d equals a number that renders the compound charge neutral and is not less than zero and not greater than about 0.8.

2. The membrane according to claim 1, wherein the x, y, y', w, v and d each represent a number such that $0.15<(y+y')<0.75$, $0.2<(x+y')<0.9$, $0.05<(x-y)<0.15$, $0.95<w<1$, and d equals a number that renders the compound charge neutral and is not less than zero and not greater than about 0.8.

3. The membrane according to claim 1, wherein $0<y<0.75$ and $0<y'<0.3$.

4. In a membrane reactor for generating heat by oxidation of a carbon containing fuel to $CO_2$ and $H_2O$ on the oxidation side of the membrane reactor, the improvement which comprises employing a membrane reactor containing the membrane of claim 1.

5. In a method for generating synthesis gas consisting of one or more of the components CO, $CO_2$, $H_2$ and $N_2$ in a membrane reactor where the reactor is capable of reacting a mixture of steam and a carbon containing fuel with oxygen permeated through said membrane to make synthesis gas, the improvement which comprises employing a membrane reactor containing the membrane of claim 1.

* * * * *